US006194342B1

(12) United States Patent
Parodi et al.

(10) Patent No.: US 6,194,342 B1
(45) Date of Patent: Feb. 27, 2001

(54) COMPONENTS AND CATALYSTS FOR THE POLYMERIZATION OF OLEFINS

(75) Inventors: Sandro Parodi; Roberto Nocci, both of Novara; Umberto Giannini, Milan; Pier Camillo Barbe'; Umberto Scata', both of Ferrara, all of (IT)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 08/469,735

(22) Filed: Jun. 6, 1995

Related U.S. Application Data

(63) Continuation of application No. 08/086,385, filed on Jun. 30, 1993, now abandoned, which is a continuation of application No. 07/807,634, filed on Dec. 13, 1991, now abandoned, which is a continuation of application No. 07/701,590, filed on May 15, 1991, which is a continuation of application No. 07/585,030, filed on Sep. 19, 1990, now abandoned, which is a continuation of application No. 07/376,143, filed on Jul. 5, 1989, now abandoned, which is a continuation of application No. 07/236,316, filed on Aug. 25, 1988, now abandoned, which is a continuation of application No. 06/689,158, filed on Jan. 7, 1985, now abandoned, which is a continuation of application No. 06/625,819, filed on Jun. 28, 1984, now abandoned, which is a continuation of application No. 06/292,155, filed on Aug. 12, 1981, now abandoned.

(30) Foreign Application Priority Data

Aug. 13, 1980 (IT) .................................................. 24141/80

(51) Int. Cl.[7] .................................................. B01J 31/04
(52) U.S. Cl. ...................... 502/127; 526/112; 526/124.2; 526/124.3; 526/125; 526/125.5
(58) Field of Search ........................ 502/127; 526/125, 526/124.2, 124.3, 112, 125.5

(56) References Cited

U.S. PATENT DOCUMENTS

| | | |
|---|---|---|
| 3,362,916 | 1/1968 | Price et al. . |
| 3,642,746 * | 2/1972 | Kashiwa et al. .................... 526/125 |
| 3,701,763 | 10/1972 | Wada et al. . |
| 4,069,169 | 1/1978 | Toyoda et al. . |
| 4,071,672 | 1/1978 | Kashiwa . |
| 4,083,802 | 4/1978 | Matsuura et al. . |
| 4,085,276 | 4/1978 | Toyota et al. . |
| 4,115,319 | 9/1978 | Scatá et al. . |
| 4,143,223 | 3/1979 | Toyota et al. . |
| 4,149,990 | 4/1979 | Giannini et al. . |
| 4,157,435 | 6/1979 | Toyota et al. . |
| 4,180,636 | 12/1979 | Hirota et al. . |
| 4,187,196 | 2/1980 | Giannini et al. . |
| 4,218,339 | 8/1980 | Zucchini et al. . |
| 4,220,745 | 9/1980 | Tanaka et al. . |
| 4,243,552 * | 1/1981 | Welch et al. ........................ 526/125 |
| 4,277,589 | 7/1981 | Giannini et al. . |
| 4,290,915 | 9/1981 | Toyota et al. . |
| 4,301,029 | 11/1981 | Caunt et al. . |
| 4,302,566 | 11/1981 | Karol et al. . |
| 4,321,345 | 3/1982 | Sato et al. . |
| 4,328,122 | 5/1982 | Monte et al. . |
| 4,329,253 | 5/1982 | Goodall et al. . |
| 4,330,649 | 5/1982 | Kioka et al. . |
| 4,331,558 * | 5/1982 | Welch et al. ........................ 526/125 |
| 4,331,561 | 5/1982 | Luciani et al. . |
| 4,336,360 | 6/1982 | Giannini et al. . |
| 4,348,507 | 9/1982 | Ueno et al. . |
| 4,369,306 | 1/1983 | Toyota et al. . |
| 4,390,671 * | 6/1983 | Imai et al. ........................ 526/125 |
| 4,393,182 | 7/1983 | Goodall et al. . |
| 4,399,054 | 8/1983 | Ferraris et al. . |
| 4,544,717 | 10/1985 | Mayr et al. . |
| 4,581,426 | 4/1986 | Asanuma et al. . |

FOREIGN PATENT DOCUMENTS

| | | |
|---|---|---|
| 868682 | 1/1979 | (BE) . |
| 421526 | 3/1967 | (CH) . |
| 13 01 071 | 8/1969 | (DE) . |
| 19 39 074 | 2/1970 | (DE) . |
| 20 29 992 | 12/1970 | (DE) . |
| 2029992 * | 12/1970 | (DE) . |
| 24 26 795 | 1/1975 | (DE) . |
| 24 61 677 | 7/1975 | (DE) . |
| 26 12 650 | 10/1976 | (DE) . |
| 26 43 143 | 6/1977 | (DE) . |
| 26 40 679 | 3/1978 | (DE) . |
| 27 42 585 | 3/1978 | (DE) . |
| 27 42 586 | 3/1978 | (DE) . |
| 27 43 366 | 3/1978 | (DE) . |
| 30 02 879 | 8/1980 | (DE) . |
| 0 013 387 A1 | 7/1980 | (EP) . |

(List continued on next page.)

OTHER PUBLICATIONS

Chem. Abst. 82:157035f.
Chem. Abst. 84:31747n.
Chem. Abst. 85:78682y.
Chem. Abst. 93:133108h.
Synthetic High Polymers, 88:7695f.
Synthetic High Polymers, 92:7198d.
Fert., Soils, Plant Nutr., 85:76682z.

Primary Examiner—David W. Wu
Assistant Examiner—Ling-Siu Choi

(57) ABSTRACT

The present invention relates to supported catalysts for the polymerization of alpha-olefins which comprise the reaction product of:

(a) an Al-alkyl compound;
(b) a silicon compound containing at least one Si—OR or Si—OCOR or Si—$NR_2$ bond, R being a hydrocarbyl radical;
(c) a solid comprising, as essential support, a Mg dihalide in active form and, supported thereon, a Ti halide or a halo-Ti-alcoholate and a particular type of electron donor compound.

The present invention also relates to supported catalyst components.

18 Claims, No Drawings

FOREIGN PATENT DOCUMENTS

| | | |
|---|---|---|
| 0 045 975 B1 | 2/1982 | (EP) . |
| 0 045 976 A2 | 2/1982 | (EP) . |
| 0 045 977 B1 | 2/1982 | (EP) . |
| 0 086 473 A2 | 8/1983 | (EP) . |
| 0 115 195 A1 | 8/1984 | (EP) . |
| 59107 | 7/1975 | (FI) . |
| 62672 | 10/1982 | (FI) . |
| 1128090 | 9/1968 | (GB) . |
| 1310547 | 3/1973 | (GB) . |
| 1387890 | 3/1975 | (GB) . |
| 1452314 | 10/1976 | (GB) . |
| 1539900 | 2/1979 | (GB) . |
| 1559194 | 1/1980 | (GB) . |
| 2 040 967 | 9/1980 | (GB) . |
| 2 052 534 | 1/1981 | (GB) . |
| 66-019993 | 11/1966 | (JP) . |
| 49-133488 | 12/1974 | (JP) . |
| 75-103495 | 8/1975 | (JP) . |
| 51-55385 | 5/1976 | (JP) . |
| 51-55386 | 5/1976 | (JP) . |
| 76-55386 | 5/1976 | (JP) . |
| 52-151691 | 2/1977 | (JP) . |
| 77-151691 | 12/1977 | (JP) . |
| 79-39484 | 3/1979 | (JP) . |
| 53-000037 | 7/1979 | (JP) . |
| 79-94590 | 7/1979 | (JP) . |
| 53-108057 | 3/1980 | (JP) . |
| 80-36203 | 3/1980 | (JP) . |
| 55-123604 | 9/1980 | (JP) . |
| 55-145706 | 11/1980 | (JP) . |
| 56-26902 | 3/1981 | (JP) . |
| 086621 | 7/1976 | (PL) . |
| 099033 | 3/1978 | (PL) . |
| 106505 | 9/1980 | (PL) . |
| 118176 | 4/1983 | (PL) . |
| 225961 | 4/1969 | (SE) . |
| 403193 | 8/1974 | (SU) . |
| 812185 | 3/1981 | (SU) . |
| 858571 | 8/1981 | (SU) . |

* cited by examiner

COMPONENTS AND CATALYSTS FOR THE POLYMERIZATION OF OLEFINS

This application is a Continuation of application Ser. No. 08/086,385, filed Jun. 30, 1993 (now abandoned), which is a Continuation of Ser. No. 07/807,634, filed Dec. 13, 1991 (now abandoned), which is a Continuation of Ser. No. 07/701,590, filed May 15, 1991, now abandoned which is a Continuation of Ser. No. 07/585,030, filed Sep. 19, 1990 (now abandoned), which in turn is a Continuation of Ser. No. 07/376,143, filed Jul. 5, 1989, (now abandoned), which in turn is a Continuation of Ser. No. 07/236,316, filed Aug. 25, 1988, (now abandoned), which in turn is a Continuation of Ser. No. 06/689,158, filed Jan. 7, 1985, (now abandoned), which in turn is a Continuation of Ser. No. 06/625,819, filed Jun. 28, 1984, (now abandoned), which in turn is a Continuation of Ser. No. 06/292,155, filed Aug. 12, 1981, (now abandoned.

BACKGROUND OF THE INVENTION

The supported highly active and highly stereospecific catalysts for the polymerization of propylene and higher olefins, known up to now are obtained by the reaction of an Al alkyl compound partially complexed with an electron donor compound (outside donor) with a solid component comprising a Ti compound and an electron-donor compound (inside donor) supported on a Mg halide in active form.

Examples of such catalysts have been described in British Patent No. 1,559,194 and Belgian Patent No. 868,682.

Outside donors consisting of silicon compounds containing Si—O—C bonds also have been described (published Japanese patent applications Sho 79/94590 and Sho 80/36203). Among the various and numerous inside donors such compounds as methyl methacrylate and ethyl pivalate also have been cited.

However, in all the prior art catalysts in which a silicon compound containing Si—O—C bonds is used as outside donor, esters of benzoic acid and derivatives thereof are used as inside donor.

The performance of the above catalysts, expressed in terms of activity and stereospecificity, is not different from the performance of the catalysts in which ethyl benzoate and similar esters of benzoic acid are used as outside donor.

THE PRESENT INVENTION

One object of this invention is to provide new catalyst-forming components comprising, as outside donor, a silicon compound containing Si—O—C bonds and an inside ester different from the esters of benzoic acid and derivatives, and which result in final catalysts of increased activity and stereospecificity as compared to the components heretofore known comprising, as inside donor, an ester of benzoic acid or derivative thereof; and the catalysts based on such components.

This and other objects are achieved by this invention in accordance with which, and unexpectedly, it has been found that it is possible to increase the activity and stereospecificity of the prior art supported catalysts comprising, as outside donor, a silicon compound containing Si—O—C bonds, by using as inside donor an ester having a particular structure as described hereinafter.

The catalysts of this invention comprise the product of reaction between the following components:

(a) an Al trialkyl or an Al-alkyl compound containing 2 or more aluminum atoms linked to each other through oxygen or nitrogen atoms or through $SO_4$ or $SO_3$ groups;

(b) a silicon compound containing one or more $S_i$—OR, Si—OCOR or Si—$NR_2$ bonds (R being a hydrocarbyl radical);

(c) a solid comprising, as essential support, an anhydrous Mg dihalide present in active form and, supported on said dihalide, a Ti halide or a Ti haloalcoholate and an electron-donor compound selected from the following groups of compounds:

(1) mono- and polyesters of saturated polycarboxylic acids wherein at least one of the esteric carbonyl groups is linked to a tertiary or quaternary carbon atom or to a linear or branched chain of at least 4 carbon atoms;

(2) mono- and polyesters of unsaturated polycarboxylic acids wherein two carboxy groups are linked to vicinal double bond-forming carbon atoms and in which at least one of the R hydrocarbyl radicals of the COOR groups is a branched saturated or unsaturated radical with 3 to 20 C atoms or is an aryl or arylalkyl radical with 6 to 20 C atoms;

(3) mono- and diesters of aromatic dicarboxylic acids having the COOH groups in ortho position wherein at least one of the R hydrocarbyl radicals of the COOR groups contains from 3 to 20 carbon atoms;

(4) mono- and polyesters of aromatic hydroxy compounds containing at least 2 hydroxyl groups in ortho position;

(5) esters of aromatic hydroxy acids wherein at least a hydroxyl group is in ortho position to the carboxy group;

(6) esters of saturated or unsaturated carboxylic acids wherein at least one of the hydrocarbyl R and R' radicals of the R COOR' group is a saturated or unsaturated branched radical containing from 3 to 20 C atoms, or is an arylalkyl radical with 7 to 20 C atoms or R is an aryl radical with 3 to 20 carbon atoms linked to the esteric carbonyl group directly or through a methylene group, and in which the R' radical contains from 3 to 20 C when it is a linear hydrocarbyl radical; and (7) esters of carbonic acid of formula

in which at least one of the R radicals which can be the same or different is a hydrocarbyl radical with 3 to 20 carbon atoms.

Representative esters which are suitable in preparing component (c) are the following:

Class 1 diethyl diisobutylmalonate, diethyl n-butylmalonate, diethyl-n-dibutylmalonate, diethylphenylmalonate, diethyl-1,2-cyclohexane-dicarboxylate, dioctylsebacate, diisobutyl adipate.

Class 2 di-2-ethyl-hexyl-maleate, diisobutylmaleate, diisobutyl-3,4-furan-dicarboxylate, di-2-ethylhexylfumarate, 2-ethylhexylmonomaleate.

Class 3 diisobutyl-2,3-naphthalen-dicarboxylate, di-n-propyl, di-n-butyl, diisobutyl, di-n-heptyl, di-2-ethyl-hexyl, di-noctyl, di-neopentil phthalates, monobutyl and monoisobutyl esters of phthalic acid, ethyl-isobutyl-phthalate, ethyl-n-butyl-phthalate.

Class 4
  2,3-diacetoxynaphthalene, 1,2-diacetoxybenzene, 1-methyl-2,3-diacetoxybenzene.
Class 5
  benzoyl-ethylsalicylate, acetyl-methylsalicylate.
Class 6
  ethylene-glycol-pivalate, 1,4-butanediol-pivalate, benzyl and isobutylpivalate, n-propylpivalate, ethyl diphenylacetate, isobutylmethacrylate, isobutylacrylate, ethyl-benzoylacetate, isobutylpyruvate, isobutyl-trans-3-methoxy-2-butenoate.
Class 7
  phenyl-ethylcarbonate, diphenyl carbonate.

Preferred compounds are the esters of maleic, pivalic, methacrylic, carbonic and phthalic acids.

As indicated, the esters of the polycarboxylic acids can contain, besides the ester groups, also unesterified COOH groups.

In preparing component (c) the esters are contacted with the active Mg dihalide or the precursors of said dihalides as preformed compounds or the esters can be formed in situ by means of known reactions as, for instance, by esterification between an alcohol or an alcoholate and an aryl halide or between an anhydride or a hemiester of a polycarboxylic acid with an alcohol or by transesterification. The esters can be used, also, in mixture with other known inside donors.

The active anhydrous Mg dihalides forming the essential support of component (c) are the Mg dihalides showing in the X-rays powder spectrum of component (c) a broadening of at least 30% of the most intense diffraction line which appears in the powder spectrum of the corresponding dihalide having 1 $m^2/g$ of surface area or are the Mg dihalides showing an X-rays powder spectrum in which said most intense diffraction line is replaced by a halo with the intensity peak shifted with respect to the interplanar distance of the most intense line and/or are the Mg dihalides having a surface area greater than 3 $m^2/g$.

The measurement of the surface area of the Mg dihalides is made on component (c) after treatment with boiling $TiCl_4$ for 2 hours. The found value is considered as surface area of the Mg dihalide.

Very active forms of Mg dihalides are those showing an X-rays powder spectrum in which the most intense diffraction line appearing in the spectrum of the corresponding halide having 1 $m^2/g$ of surface area is decreased in relative intensity and broadened to form a halo or are those in which said most intense line is replaced by a halo having its intensity peak shifted with respect to the interplanar distance of the most intense line. Generally, the surface area of the above forms is higher than 30–40 $m^2/g$ and is comprised in particular between 100–300 $m^2/g$.

Active forms are also those deriving from the above forms by heat-treatment of component (c) in inert hydrocarbon solvents and showing in the X-rays spectrum sharp diffraction lines in place of the halos.

The sharp, most intense line of these forms shows, in any case, a broadening of at least 30% with respect to the corresponding line of the Mg dihalide having 1 $m^2/g$ of surface area. Preferred Mg dihalides are Mg dichloride and Mg dibromide. The content in water of the dihalides is generally less than 1% by weight.

By Ti halides or Ti haloalcoholates and esters supported on active Mg dihalide is meant the above compounds which may be chemically or physically fixed on the support, and not extractable from component (c) by treatment of the same with boiling 1,2-dichloroethane for 2 hours.

Components (a), (b) and (c) are made to react with each other in any order; preferably, however, components (a) and (b) are premixed before being contacted with component (c).

Component (c) may be premixed with either component (a) and/or (b). The pre-mixing of (a) and (b) is conducted at temperatures comprised, usually, between room temperature and the temperature used in the polymerization process.

The pre-reaction of (c) and (b) may be carried out also at higher temperatures. Compound (b) may be also incorporated and made to react with component (c) itself. Component (b) is made to react in a molar ratio with respect to the halogenated Ti compound supported on component (c) of at least 1 and in a molar ratio with respect to the Al-alkyl compound used as component (a) of less than 20 and preferably comprised between 0.05 to 0.3.

In component (c), the molar ratio between the Mg dihalide and the halogenated Ti compound supported therein is comprised between 1 and 500 and the molar ratio between said halogenated Ti compound and the electron-donor supported on the Mg dihalide is comprised between 0.1 and 50.

The silicon compounds set forth in (b) include compounds of general formula:

$$R_m SiY_n X_p$$

wherein:
  R is an alky, alkenyl, aryl, arylalkyl, cycloalkyl radical with from 1 to 20 carbon atoms;
  Y is —OR', —OCOR', —$NR_2$' wherein R', either equal to or different from R, has the same meaning as R;
  X is either a halogen or hydrogen atom or an —OCOR" or —$NR_2$" group wherein R", either equal to or different from R', has the same meaning as R';
  m, n and p are numbers comprised respectively between m between 0 and 3, n between 1 and 4 and p between 0 and 1; and m+n+p is equal to 4.

Other silicon compounds that may be used are compounds in which two or more silicon atoms are bound to each other through oxygen or nitrogen atoms.

Examples of these compounds are hexaethoxydisiloxane, and symmetrical diphenyltetraethoxydisiloxane

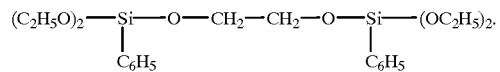

Preferred silicon compounds are: phenylalkoxysilanes such as phenyltriethoxy or trimethoxysilane, diphenyldimethoxy and diethoxysilane, monochlorophenyldiethoxysilane, alkylalkoxysilanes such as ethyltriethoxysilane, ethyltriisopropoxysilane.

Examples of other suitable compounds are: chlorotriethoxysilane, acetoxytriethoxysilane, vinyltriethoxysilane, butyltriethoxysilane, triphenylmonoethoxysilane, phenyltricycloethoxysilane, phenyldiethoxydiethylaminosilane, tetraphenoxysilane or tetralkoxysilanes as tetramethoxysilane.

The silicon compound can be also formed in situ by reaction of, for instance, a halogenated silicon compound such as $SiCl_4$ with an alcohol or an alcoholate of Mg or Al.

In the catalysts of the invention, the silicon compound is present, in a combined form in the solid product of the reaction between the various catalyst-forming components, in a molar ratio between the silicon compound and the halogenated Ti compound greater than 0.05 and generally comprised between 0.1 and 5.

The Al-alkyl compounds forming component (a) include Al-trialkyls as, for instance, Al triethyl, Al triisobutyl, Al triisopropyl and compounds containing two or more Al atoms linked to each other through hetero-atoms, such as:

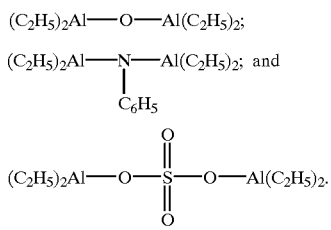

As indicated, Al alkyl compounds in which Al atoms are linked through groups such as $SO_4$ or $SO_3$ are also suitable.

The Al alkyl compounds may be used in mixture with Al-alkyl halides such as, for example, $AlEt_2Cl$.

Component (c) is prepared according to known methods. One of these methods consists in co-milling the Mg dihalide and the electron-donor compound of this invention until the appearance in the X-ray spectrum of the milled product of the modifications above set forth for the spectrum of the Mg dihalide, and thereafter reacting the milled product with the Ti-compound.

Preparations of this type are described in British Patent No. 1,559,194.

Another method consists in reacting the adduct of a Mg halide with an alcohol, with a Ti compound in the presence of an electron-donor compound not containing active hydrogen atoms. This method is described in Belgian Patent No. 868,682.

According to another method, which is described in published German patent application No. 3,022,738, the adduct between the Mg dihalide and the alcohol is reacted in liquid form with the halogenated Ti compound and the electron-donor compound.

Further methods are described in published German application 2,924,029 and U.S. Pat. No. 4,220,554 as well as in the U.S. application of Antonio Monte et al, Ser. No. 206,541, filed Nov. 13, 1980, now U.S. Pat. No. 4,328,122, granted May 4, 1982.

Another method consists in co-milling the Mg dihalide, the halogenated Ti compound and the electron-donor compound until the Mg dihalide is activated and in treating a suspension of the milled product in a halogenated hydrocarbon, for instance 1,2-dichloroethane, chlorobenzene, methylene chloride or hexachloroethane.

The treatment is carried out at temperatures comprised between 40° C. and the boiling point of the halogenated hydrocarbon for a time ranging in general from 1 to 4 hours.

According to another method, a porous support like $SiO_2$ or $Al_2O_3$, having a low content of OH groups (preferably less than 1% by weight) is impregnated with a liquid adduct between the Mg dihalide and an alcohol; the support is then treated with an excess of $TiCl_4$ containing, dissolved therein, the electron-donor compound, the procedure being as described, for instance, in published German patent application No. 3,022,738 or Belgian patent 868,682.

In all the above methods, the final product contains a Mg dihalide present in the active form as set forth hereinabove.

Other known methods which lead to the formation of Mg dihalide in active form or to Ti containing Mg dihalide supported components, in which the dihalide is present in active form, are based on the following reactions:

reaction of a Grignard reagent or a $MgR_2$ compound (R being a hydrocarbyl radical) or complexes of said $MgR_2$ compounds with Al trialkyls, with halogenating agents as $AlX_3$ or $AlR_mX_n$ compounds (X is halogen, R is a hydrocarbyl, m+n=3), $SiCl_4$ or $HSiCl_3$;

reaction of a Grignard reagent with a silanol or polysiloxane, $H_2O$ or with an alcohol and further reaction with a halogenating agent or with $TiCl_4$;

reaction of Mg with an alcohol and a halogenhydric acid or of Mg with a hydrocarbyl halide and an alcohol;

reaction of MgO with $Cl_2$ or $AlCl_3$;

reaction of $MgX_2 \cdot nH_2O$ (X=halogen) with halogenating agent or $TiCl_4$;

reaction of Mg mono- or dialcoholates or Mg carboxylates with a halogenating agent.

The Ti-halides or Ti halogenalcoholates include, in particular, the Ti tetrahalides, Ti trihalides and Ti trihalogenalcoholates. Preferred compounds are: $TiCl_4$, $TiBr_4$, 2,6-dimethylphenoxytrichlorotitanium.

The Ti trihalides are obtained according to known methods, for instance by reduction of $TiCl_4$ with Al, an organometallic Al compound or hydrogen.

In the case of the Ti trihalides, it may be convenient, for the purpose of improving the performance of the catalysts, to carry out an oxidization, even if partial, of the titanium, either during or after the preparation of component (c). For this purpose there may be used halogens, iodine halides.

Preferred catalysts are those in which component (c) is obtained from $MgCl_2$, $TiCl_4$ and esters of maleic, pivalic and phthalic acids and in which component (b) is phenyl or ethyltriethoxysilane or diphenyldimethoxy or diethoxysilane.

Component (a) is an Al trialkyl as Al triethyl or Al triisobutyl.

Component (c) is prepared according to the methods described in British Patent No. 1,559,194, Belgian Patent No. 868,682, published German application No. 2,924,029, U.S. Pat. No. 4,220,554, published German application No. 3,022,738 or in the Monte et al application referred to supra.

The preferred method of preparing component (c) includes also the co-milling of $MgCl_2$, $TiCl_4$ and the ester and in treating the milled product with a halogenated hydrocarbon, such as 1,2-dichloroethane.

The catalysts according to the invention are used to polymerize the alpha-olefins according to known methods that is by carrying out the polymerization in a liquid phase, either in the presence or absence of an inert hydrocarbon solvent, or in gas phase or also by combining, for instance, a liquid phase polymerization step with a step in gas phase.

In general, the polymerization temperature is comprised between 40° and 160° C., but preferably between 60° and 90° C., operating either at atmospheric or at greater than atmospheric pressure.

As a molecular weight regulator hydrogen or other regulators of a known type are used.

The catalysts are particularly suitable for polymerizing propylene, butene-1, styrene and 4-methylpentene. The catalysts may also be used according to known methods to polymerize mixtures of propylene and ethylene to form modified polypropylenes having better shock-resistance at low temperatures (the so called block copolymers of propylene and ethylene) or to obtain random crystalline copolymers of propylene with minor proportions of ethylene.

The following examples are given for merely illustrative purpose and are not intended to be in any way limiting with respect to the scope of the invention.

EXAMPLES 1–10

Into a stainless steel autoclave having a total volume of 3 l, equipped with a magnetized stirrer and a thermocouple heat-stabilized at 60° C. and kept under pressure by a nitrogen atmosphere, there were introduced 1,000 ml of a suspension in degassed and anhydrous n-heptane containing 5 m mols of triethylaluminum, the phenyltriethoxysilane (PES) and a solid catalytic component prepared according to Example 1 of the aforementioned pending Monte et al application, but using, instead of ethylbenzoate, the esters listed in Table I, while propylene was also fed in. The catalytic components thus prepared showed X-rays powder spectra in which the most intense diffraction line appearing in the spectrum of $MgCl_2$ having 1 $m^2/g$ of surface area is decreased in relative intensity and broadened to form a halo.

The autoclave was closed and thereafter hydrogen was introduced up to a pressure of 0.2 atmospheres, the temperature was brought to 70° C. and simultaneously, propylene was introduced up to a total pressure of 7 atmospheres.

During the polymerization, the pressure was kept constant by continuous feeding of the monomer. After 4 hours, the polymerization was stopped by quick cooling and degassing of the polymeric slurry. The polymer was separated from the solvent by filtering and was dried in a hot nitrogen flow at 70° C. The quantity of polymer dissolved in the filtrate was thereupon isolated, weighed and summed to the polymer soluble in boiling n-heptane, for calculation of the isotacticity index (I.I.).

The quantity of catalytic component used and the content of Ti in said component, the molar ratio of the phenyltriethoxysilane with respect to the triethylaluminum, the yield in polymer with respect to the introduced catalytic component, the isotacticity index (I.I.), the surface area of the solid catalytic component and the inherent viscosity determined in tetralin at 135° C., are reported in Table I.

EXAMPLE 11

Example 8 was repeated under the same polymerization conditions described in Examples 1–10, but using a solid catalytic component prepared according to Example 7 of published German patent application 2,643,143.

The catalytic component showed an X-rays powder spectrum in which the most intense diffraction line appearing in the spectrum of $MgCl_2$ having 1 $m^2/g$ of surface area is decreased in relative intensity and broadened to form a halo.

The content of Ti in the solid catalytic component, the quantity of said component, the molar ratio between triethylaluminum and PES, and the results of the polymerization test are reported in Table I.

EXAMPLE 12

The solid catalytic component prepared according to Example 11 was suspended in the inert hydrocarbon solvent Isopar G (a mixture of isoparaffinic hydrocarbons boiling in the temperature range of from 158° to 172.5° C.) and heat-treated at 120° C. for 24 hours. The catalytic components thus obtained showed an X-rays powder spectrum in which the most intense diffraction line appeared as a sharp line, the half peak breadth of which, however, was broadened more than 30% of the corresponding half peak breadth of $MgCl_2$ having 1 $m^2/g$ of surface area.

The catalyst component obtained was used under the same polymerization conditions as described in Example 11.

The characteristics of the solid catalytic component and the results of the polymerization test are reported in Table I.

COMPARATIVE EXAMPLES 1 AND 2

Example 1 was repeated but using the solid catalytic component prepared according to Example 1 of Italian patent application No. 27,261/79, which is the priority document for the aforementioned pending Monte et al U.S. application. The X-rays powder spectrum was similar to that of the catalytic component of Example 1.

The results of the polymerization tests are reported in Table I.

COMPARATIVE EXAMPLE 3

Example 11 was repeated except that the solid catalytic component prepared according to Example 7 of German patent application 2,643,143 was used. The X-rays powder spectrum was similar to that of catalytic component of Example 11.

The results of the polymerization tests have been reported in Table I.

EXAMPLES 13–18

Example 1 was repeated using a solid catalytic component prepared as follows.

Anhydrous $MgCl_2$, an ester, listed in Table II, and $TiCl_4$ in molar ratio of 1:1 with respect to the ester, were co-ground in a vibrating mill of the type VIBRATOM manufactured by N.V. TEMA, s'Gravenhage, Holland, having a total volume of one liter and containing 3 kg of stainless steel balls of 16 mm diameter.

Grinding was effected for 72 hours employing a filling coefficient equal to 100 g/l of total volume (vacuum), at an interior temperature of the mill of 25° C.

Charging of the mill, the grinding and discharging of the mill occurred in a nitrogen atmosphere.

10 g of the co-ground product were contacted with 100 ml of 1,2-dichloroethane at 80° C. for 2 hours. After this period, 1,2-dichloroethane was removed by filtration at 80° C. and the residual solid product was repeatedly washed with n-heptane at room temperature until the chlorine ions disappeared from the filtrate and then was kept in heptanic suspension.

The catalytic components thus prepared showed an X-rays powder spectrum in which the most intense diffraction line appearing in the spectrum of $MgCl_2$ having 1 $m^2/g$ of surface area was decreased in relative intensity and broadened to form a halo.

The type of ester used, the characteristics of the solid catalytic component, and the results of polymerization tests have been reported in Table II.

EXAMPLES 19–26

Example 1 was repeated but using a solid catalytic component prepared according to Example 3 of Italian Patent application No. 26,908 A/78, which is the priority document for the U.S. application of Mario Ferraris et al, Ser. No. 226,837, filed Jan. 21, 1981, now U.S. Pat. No. 4,399,054, granted Aug. 16, 1983.

A solid adduct $MgCl_2.2.5C_2H_5OH$ in the form of spherical particles was slowly added to a suspension of an adduct $TiCl_4$-ester using molar ratios Mg/ester of 10 and $TiCl_4/C_2H_5OH$ of 10.

The whole was then heated at 100° C., kept at said temperature for 2 hours and then filtered at 100° C. The resulting solid product was treated with 110 ml of $TiCl_4$ at 120° C. for 2 hours. After this period, $TiCl_4$ was removed by filtration and the solid was washed with n-heptane at temperatures decreasing from 90° C. to room temperature until the chlorine ions disappeared from the filtrate and then kept in heptanic suspension.

The catalytic components thus prepared showed the X-rays spectra similar to those of the catalytic component of Examples 1–10.

The esters used, the characteristics of the solid catalytic component and the results of the polymerization tests are reported in Table III.

COMPARATIVE EXAMPLE 4

Example 19 was repeated but using the solid catalytic component prepared according to Example 3 of the Italian Patent Application 26,908 A/78. The X-rays spectrum of that catalytic component was similar to those of Examples 1–10.

The characteristics of the solid product and the results of the polymerization test are given in Table III.

EXAMPLES 27–29

Example 1 was repeated, but using a solid catalytic component prepared according to Example 1 of published German Patent Application 3,022,738, wherein, instead of ethylbenzoate, esters of phthalic acid, listed in Table IV, were used and the treatment with TiCl$_4$ was effected at 120° C.

The X-rays spectrum of the catalytic components was similar to those of Examples 1–10.

The type of ester and the ratios are shown in Table IV, together with the working conditions and the results of the polymerization tests.

COMPARATIVE EXAMPLE 5

Example 27 was repeated but using a solid catalytic component prepared according to Example 1 of German Patent Application 3,022,738.

The working conditions and the results of the polymerization test are reported in Table III.

EXAMPLES 30–34

Example 8 was repeated using instead of phenyltriethoxysilane an equimolecular amount of the alkoxysilanes reported in Table V.

The characteristics of the catalytic components and the results of the polymerization tests are reported in Table V.

TABLE I

| | | Solid catalytic component | | | Polymerization | | | | |
|---|---|---|---|---|---|---|---|---|---|
| Example No. | Ester | MgCl$_2$ ester grinding mols/mols | Ti content of solid component % by weight | Surface area m$^2$/g | Al(C$_2$H$_5$)$_3$ PES mols/mols | Catalyst mg | yield g polymer g catalyst component | I.I. % | η in h dl/g |
| 1 | diisobutyl-2,3-naphthalen-dicarboxylate | 14 | 2.3 | — | 10 | 35 | 7,750 | 92.7 | 1.1 |
| 2 | di-2-ethyl-hexyl-maleate | 14 | 1.8 | 296 | 10 | 25 | 6,600 | 94 | 1.1 |
| 3 | diisobutylmaleate | 14 | 2.9 | — | 10 | 54 | 5,700 | 92.2 | 1.2 |
| 4 | isobutylacetate | 7 | 3.2 | — | 10 | 32 | 5,700 | 91.2 | 1.8 |
| 5 | isobutylpivalate | 7 | 2.6 | — | 10 | 22 | 9,700 | 92.9 | 1.3 |
| 6 | diethyl diisobutyl-malonate | 14 | 2.4 | — | 10 | 47 | 4,750 | 94.3 | 1.7 |
| 7 | di-n-butylphthalate | 14 | 2.6 | — | 20 | 35 | 9,600 | 91.2 | 1.3 |
| 8 | diisobutylphthalate | 14 | 2.4 | 350 | 20 | 36 | 16,100 | 91.8 | 1.3 |
| 9 | diisobutylphthalate | 14 | 2.4 | 350 | 10 | 38 | 13,200 | 95.5 | 1.2 |
| 10 | di-2-ethylhexylsebacate | 14 | 2.3 | — | 10 | 52 | 4,500 | 94.8 | 1.2 |
| 11 | di-isobutyl-phthalate | 8 | 3.0 | — | 10 | 17 | 15,000 | 97.5 | 1.6 |
| 12 | di-isobutyl-phthalate | 8 | 1.4 | 21.8 | 10 | 14 | 7,000 | 97.2 | 1.5 |
| comp. 1 | ethylbenzoate | 7 | 2.0 | 266 | 10 | 46 | 6,000 | 90.6 | 1.4 |
| comp. 2 | ethylbenzoate | 7 | 2.0 | 266 | 5 | 47 | 4,000 | 92.7 | 1.6 |
| comp. 3 | ethylbenzoate | 7 | 1.5 | — | 3.33 | 60 | 2,400 | 91.3 | 1.2 |

TABLE II

| | | Solid catalytic component | | | Polymerization | | | | |
|---|---|---|---|---|---|---|---|---|---|
| Example No. | Ester | MgCl$_2$ ester grinding mols/mols | Ti content of solid component % by weight | Surface area m$^2$/g | Al(C$_2$H$_5$)$_3$ PES mols/mols | Catalyst mg | Yield g polymer g catalyst component | I.I. % | η in h dl/g |
| 13 | diphenylcarbonate | 8 | 2 | — | 10 | 29 | 6,050 | 93.2 | 1.5 |
| 14 | 1,2-diidroxy-diacetate benzene | 6 | 1.3 | — | 10 | 41 | 6,100 | 92.1 | 1.4 |
| 15 | ethyl-diphenylacetate | 5 | 1.9 | — | 10 | 38 | 6,400 | 91.1 | 1.2 |
| 16 | diisobutyl-phthalate | 7 | 1.4 | 157 | 20 | 19 | 9,100 | 98 | 1.3 |

TABLE II-continued

| | | Solid catalytic component | | | | Polymerization | | | |
|---|---|---|---|---|---|---|---|---|---|
| Example No. | Ester | MgCl₂ ester grinding mols/mols | Ti content of solid component % by weight | Surface area m²/g | Al(C₂H₅)₃ PES mols/mols | Catalyst mg | Yield g polymer g catalyst component | I.I. % | η in h dl/g |
| 17 | diisobutyl-phthalate | 7 | 1.4 | 157 | 10 | 20 | 9,000 | 94.3 | 1.1 |
| 18 | isobutyl-benzoylacetate | 7 | 2.1 | — | 10 | 42 | 5,900 | 95.4 | 1.2 |

TABLE III

| | | Solid catalytic component | Polymerization | | | | |
|---|---|---|---|---|---|---|---|
| Example No. | Ester | Ti content of solid component % by weight | Al(C₂H₅)₃ PES mols/mols | Catalyst mg | Yield g polymer g catalyst component | I.I. % | η in h dl/g |
| 19 | dioctylphthalate | 2.7 | 20 | 19 | 12,100 | 92.2 | 1.8 |
| 20 | diisobutylphthalate | 2.4 | 20 | 22 | 13,900 | 96.9 | 1.2 |
| 21 | dineopentylphalate | 3.5 | 20 | 15 | 18,500 | 97 | 1.2 |
| 22 | diphenylphthalate | 2.6 | 10 | 25 | 11,000 | 94.5 | 1.8 |
| 23 | diethyl-butylmalonate | 3.9 | 10 | 29 | 12,800 | 93.3 | 1.7 |
| 24 | benzyl butylpthalate | 3.1 | 20 | 24 | 14,000 | 96.1 | 1.4 |
| 25 | mono-2-ethyl-hexylmaleate | 2.8 | 10 | 50 | 8,000 | 92.5 | 1.3 |
| 26 | monoisobutylphthalate | 3.1 | 10 | 24 | 10,000 | 94.3 | 1.6 |
| comp. 4 | ethylbenzoate | 3.8 | 5 | 38 | 6,850 | 91.5 | 1.5 |

TABLE IV

| | | Solid catalytic component | | | Polymerization | | | |
|---|---|---|---|---|---|---|---|---|
| Example No. | Ester | MgCl₂ ester grinding mols/mols | Ti content of solid component % by weight | Al(C₂H₅)₃ PES mols/mols | Catalyst mg | Yield g polymer g catalyst component | I.I. % | η in h dl/g |
| 27 | dioctylphthalate | 4.7 | 1.9 | 20 | 27 | 12,000 | 93.9 | 1.5 |
| 28 | isobutylphthalate | 4.7 | 3.8 | 20 | 32 | 10,000 | 96.5 | 1.4 |
| 29 | neopentylphthalate | 9.4 | 1.9 | 20 | 30 | 12,800 | 97.8 | 1.0 |
| comp. 5 | ethylbenzoate | 5 | 3.1 | 10 | 49 | 7,900 | 94.2 | 1.5 |

TABLE V

| | | Polymerization | | | |
|---|---|---|---|---|---|
| Example No. | Alkoxysilane | Catalyst mg | Yield g polymer g catalyst component | I.I. % | η in h dl/g |
| 30 | ethyltriethoxysilane | 33.4 | 11,000 | 89.3 | 1.2 |
| 31 | chlorophenyldiethoxysilane | 44.6 | 9,800 | 91.0 | 1.3 |
| 32 | diphenyldiethoxysilane | 25.1 | 14,300 | 92.4 | 1.0 |
| 33 | phenyldiethoxysilane | 31.2 | 13,200 | 91.5 | 1.3 |
| 34 | diphenyldimethoxysilane | 22.2 | 18,200 | 93.1 | 1.5 |

What is claimed is:

1. A solid component for use in a catalyst comprising MgCl₂ in active form as essential support, the MgCl₂ essential support having a surface area higher than 40 m²/g, and, supported on the MgCl₂, a Ti halide or haloalcoholate and an ester selected from the group consisting of diesters of aromatic dicarboxylic acids having the COOH groups in ortho position and wherein the R hydrocarbyl radicals of the COOR groups contains from 3 to 20 carbon atoms, whereby when said solid component is combined with an Al-alkyl compound and a silicon compound containing at least one Si—OR, Si—OCOR or Si—NR₂ bond, R being a hydrocarbyl radical, it forms a catalyst for the polymerization of olefins of which the selected ester is the inside donor and the silicon compound is the outside donor, said silicon compound being made to react in a molar ratio with respect to the halogenated Ti compound supported on said solid component of at least 1 and in a molar ratio with respect to the Al-alkyl compound of less than 20, said solid component further having a molar ratio between said $MgCl_2$ and the Ti compound supported therein between 1 and 500 and the molar ratio between the Ti compound and the inside donor supported on said $MgCl_2$ being between 0.1 and 50.

2. The solid catalyst component of claim 1 wherein the ester is a diester of phthalic acid.

3. A solid component for use in a catalyst for the polymerization of olefins, said solid component comprising $MgCl_2$ in active form as essential support, wherein the $MgCl_2$ essential support has a surface area higher than 40 $m^2/g$ and, supported on the $MgCl_2$, a Ti halide or haloalcoholate and an ester which is selected from the group consisting of di-n-propyl, di-n-butyl, diisobutyl, di-n-heptyl, di-2-ethyl-hexyl, di-n-octyl, di-neo-pentyl phthalates, ethyl-isobutyl-phthalate, and ethyl-n-butyl phthalate.

4. The solid component for use in a catalyst as defined in claim 3, in which the Ti halide is a tetrahalide.

5. The solid component for use in a catalyst as defined in claim 3, wherein the ester is di-n-butyl phthalate.

6. The solid component for use in a catalyst as defined in claim 3, wherein the ester is diisobutyl phthalate.

7. The solid component for use in a catalyst as defined in claim 3, wherein the $MgCl_2$ essential support has a surface area between 100–300 $m^2/g$.

8. A catalyst for the polymerization of olefins comprising a solid component which includes $MgCl_2$ in active form as essential support, wherein the $MgCl_2$ essential support has a surface area higher than 40 $m^2/g$ and, supported on the $MgCl_2$, a Ti halide or haloalcoholate and an ester which is selected from the group consisting of di-n-propyl, di-n-butyl, diisobutyl, di-n-heptyl, di-2-ethyl-hexyl, di-n-octyl, di-neo-pentyl phthalates, ethyl-isobutyl-phthalate, and ethyl-n-butyl phthalate, wherein, said solid component is combined with an Al-alkyl compound and a silicon compound containing at least one Si—OR, Si—OCOR or Si—$NR_2$ bond, R being a hydrocarbyl radical, forming said catalyst for the polymerization of olefins of which the selected ester is the inside donor and the silicon compound is the outside donor, said silicon compound being made to react in a molar ratio with respect to the halogenated Ti compound supported on said solid component of at least 1 and in a molar ratio with respect to the Al-alkyl compound of less than 20, said solid component further having a molar ratio between said $MgCl_2$ and the Ti compound supported therein between 1 and 500 and the molar ratio between the Ti compound and the inside donor supported on said $MgCl_2$ being between 0.1 and 50.

9. The catalyst as defined in claim 8, wherein the ester is di-n-butyl phthalate.

10. The catalyst as defined in claim 8, wherein the ester is diisobutyl phthalate.

11. The catalyst as defined in claim 8, wherein the $MgCl_2$ essential support has a surface area between 100–300 $m^2/g$.

12. The catalyst as defined in claim 8, in which the Ti halide is a tetrahalide.

13. Catalysts for the polymerization of alpha-olefins, comprising the product of reaction of the following components:

(a) an Al trialkyl or an Al alkyl compound containing 2 or more Al atoms linked to each other through an oxygen or nitrogen atom or through $SO_4$ or $SO_3$ groups;

(b) a silicon compound having the formula $RmSiYnXp$ in which R is an alkyl, alkenyl, aryl, arylalkyl, cycloalkyl radical with from 1 to 20 carbon atoms; Y is —OR', —OCOR', $NR'_2$ wherein R', either equal to or different from R, has the same meaning as R;

X is either a halogen or a hydrogen atom or an —OCOR" or —$NR_2$" wherein R", either equal to or different from R', has the same meaning as R';

m, n and p are numbers with m between 0 and 3, n between 1 and 3, and p between 0 and 1; and m+n+p is 4;

(c) a solid component comprising an anhydrous $MgCl_2$ in active form, as essential support, wherein the $MgCl_2$ essential support has a surface area higher than 40 $m^2/g$ and, supported on said $MgCl_2$, a Ti halide or a Ti haloalcoholate and a diester of an aromatic dicarboxylic acid having the carboxylic acid groups COOH in the ortho position relative to each other and the R hydrocarbyl radicals of the COOR groups contains from 3 to 20 carbon atoms.

14. The catalyst as defined in claim 13, wherein the ester is di-n-butyl phthalate.

15. The catalyst as defined in claim 13, wherein the ester is diisobutyl phthalate.

16. The catalyst as defined in claim 13, wherein the $MgCl_2$ essential support has a surface area between 100–300 $m^2/g$.

17. The catalyst as defined in claim 13, in which the Ti halide is a tetrahalide.

18. The catalyst of claim 13 wherein the ester in solid component (c) is a diester of phthalic acid.

* * * * *